Oct. 9, 1951 L. J. F. ELL 2,570,222
ELECTRIC MOTOR
Filed April 19, 1947

INVENTOR
Lars Johan Faix Ell
BY
E A Flmander
his ATTORNEY

Patented Oct. 9, 1951

2,570,222

UNITED STATES PATENT OFFICE 2,570,222

ELECTRIC MOTOR

Lars Johan Faith Ell, Stockholm, Sweden, assignor to Aktiebolaget Elektrolux, Stockholm, Sweden, a corporation of Sweden Application April 19, 1947, Serial No. 742,553
In Sweden April 26, 1946

13 Claims. (Cl. 318—421)

This invention relates to electric motors and more particularly to regulating systems for controlling the supply of electric current thereto.

In order to avoid objectionable current surges when a motor is connected to a source of electrical supply, electric motors are often provided with a starting resistor or auxiliary starting winding which is connected in the motor circuit when operation of the motor is first started. After the motor has been started, such starting resistor or auxiliary winding is cut out of the motor circuit, and again connected in the motor circuit when the motor is stopped.

It is an object of the invention to provide an improvement for regulating the current supply to electric motors. More particularly, it is an object to provide such an improvement for regulating the current supply to electric motors provided with a starting resistor or auxiliary starting winding.

In accordance with the invention, this is accomplished by providing a movable element adjacent a fan member driven by an electric motor, and utilizing such element to operate a device for regulating the current supply to the motor responsive to changes in air pressure differential developed by the fan member which in turn is dependent upon the motor speed. In a preferred form, the movable element comprises a plate or screen which is biased to move in one direction axially of the motor shaft, and which is caused to move in the opposite direction responsive to the suction effect developed by the fan member.

In motors having a starting resistor connected in the motor circuit, the device operated by the movable element comprises a switch arranged to short circuit the starting resistor when the suction effect developed by the fan member reaches a definite value, and to again connect the starting resistor in the motor circuit when the suction effect developed by the fan member reaches a low value upon stopping the motor. The plate or screen serving as the movable element desirably is positioned closely adjacent to the side of the fan member opposite its inlet or intake opening, and may be advantageously employed as a part of the housing for the fan member.

The above and other objects and advantages of the invention will be more fully understood upon reference to the following description and accompanying drawing forming a part of this specification, and of which—

Figure 1:
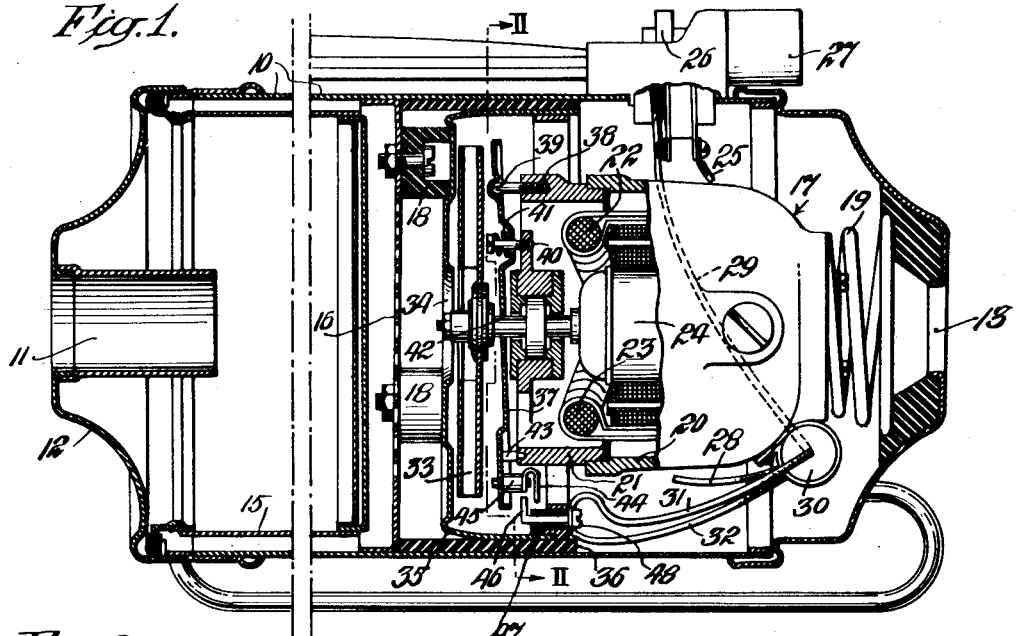
Fig. 1 is a longitudinal sectional view of a vacuum cleaner of the horizontal type, partly broken away and fore-shortened, illustrating an electric motor and fan member driven thereby embodying the invention.

Referring to the drawing, the invention is shown in connection with a suction or vacuum cleaner of the horizontal type comprising a cylindrical casing 10, a removably connected front end cover 12 having a central opening 11 to which is adapted to be connected a suction tube (not shown), and a removably connected rear end cover having an exhaust or discharge aperture 13. Within the casing 10 is provided a perforated partition or wall 16 at one side of which is disposed a filter bag 15 for collecting dirt. At the opposite side of the partition 16 is disposed a fan motor unit 17. The unit 17 is resiliently mounted within the casing 10 by rubber members 18 and a metallic spiral-shaped spring 19.

Figure 5:
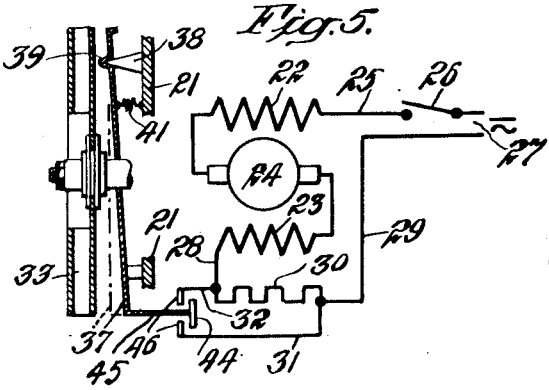
Fig. 5 is a diagrammatic illustration of the embodiment shown in Figs. 1 and 2.

As shown in Figs. 1 and 5, the motor of the fan motor unit is a so-called universal motor which is operable either with direct current or alternating current. The motor includes an armature 24 and field windings 22 and 23 connected in series therewith and to which current is supplied from a source of electrical supply 27 through leads 25 and 29 in one of which is connected a switch 26. In order to avoid objectionable current surges when the motor is connected to the source of electrical supply 27, a starting resistor 30 is connected in the lead 29 of the motor circuit. The starting resistor 30 is short-circuited after the motor has been started, as will be described presently. As best shown in Fig. 1, the armature 24 and field windings 22 and 23 are enclosed in a housing 20 and bearing shield 21.

To the motor shaft at one end thereof is fixed a centrifugal fan 33 which is surrounded by a metal cover 35 having a central opening 34 which is circular and closely adjacent the inlet of the fan 35. The metal cover 35 is supported within the casing 10 by an annular-shaped member 36 which desirably is formed of suitable insulating material. When the vacuum cleaner is being operated and the fan 33 driven by the motor 17, air is drawn through the suction tube (not shown) adapted to be connected to the opening 11 in the front end cover 12. Such air free of dirt passes through the filter bag 15 and flows through the perforated partition 16 and intake opening 34 into the fan inlet. The air is discharged from the outer periphery of the fan 33 and passes over the motor casing 20 and through the exhaust or discharge opening 13 in the rear end cover.

In accordance with the invention, a regulating system is provided for controlling the current supply to the motor 17 which comprises a plate or screen 37 disposed between the motor bearing shield 21 and the fan 33. The screen 37 is provided with a central opening 42 through which the motor shaft extends, and desirably is of circular shape and stamped from flat sheet metal. The screen 37 is formed with spaced apart depressions 39 adapted to receive the ends of studs 38 threadedly connected to the bearing shield 21. The screen 37 is biased toward the bearing shield 21 by a spiral spring 41 which acts against the screen and is held in position at the head end of a screw 40.

Figure 2:
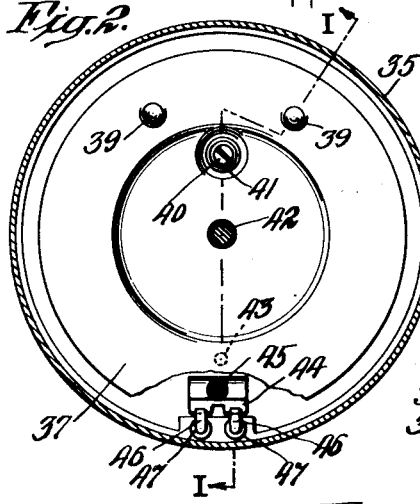
Fig. 2 is a sectional view taken at line II—II of Fig. 1 to illustrate details more clearly.

As seen in Figs. 1 and 2, the studs 38 are located at the same elevation and maintained in engagement with the depressions 39 by the spring 41 for supporting the screen 37. With this construction the screen 37 is movable axially of the motor shaft about a pivotal axis which passes substantially horizontally through the outer ends of the studs 38. When the motor is not being operated and the motor shaft is stationary, the screen 37 is urged by the spring 41 against a stop pin 43 projecting outwardly from and fixed to the bearing shield 21.

To the extreme lower part of the screen 37, and at a region removed as much as possible from the pivotal axis at the studs 38, is fixed a short-circuiting bar 44. The bar 44 is desirably formed from a strip of resilient material and secured to the screen 37 by a block 45 of insulating material. The bar 44 is adapted to engage two spaced apart contact pins 46 which are hook-shaped and rigidly mounted on the bearing shield 21 by bushings 47 of insulating material. As seen in Fig. 1, the contact pins 46 are provided with terminals 48 to which are connected the ends of leads or conductors 31 and 32, the opposite ends of which are connected to the ends of the starting resistor 30.

When the vacuum cleaner is not being used and the switch 26 is open, the fan 33 and motor shaft are stationary. Under these conditions the screen 37 is urged against the stop pin 43 and the bar 44 is out of contact with the pins 46, so that the resistor 30 is connected in the motor circuit. Upon closing the switch 26 the motor is energized and the armature 24 starts to rotate. While the armature speed progressively increases, the starting resistor 30 remains connected in the motor circuit. During starting of the motor the circuit includes the armature 24, field windings 22 and 23, leads 25 and 29 which are connected to the source of electrical supply 27, and resistor 30 which is connected to the leads 28 and 29 in series with the field winding 23.

When the motor has attained a definite speed, the lower part of the screen 37 will be sucked toward the forward part of the vacuum cleaner, that is, in a direction toward the left in Figs. 1 and 5, to such an extent that the bar 44 will contact and engage the contact pins 46. When this occurs, the starting resistor 30 is short-circuited and the connection to the motor from the lead 29 will include the lead 31, contact pins 46 and bar 44, and lead 28. The particular motor speed at which the starting resistor 30 is short-circuited in the manner just described can be nicely adjusted by tightening or loosening the screw 40 to increase or decrease the tension of spring 41.

Upon opening the switch 26 and disconnecting the motor from the source of electrical supply 27, the screen 37 automatically returns to the position shown in Fig. 1 due to the biasing action of the spring 41. This is so because the suction effect developed by the fan 33 terminates when it is no longer being driven by the motor and it stops. The screen 37 will also move to the position shown in Figs. 1 and 5 when the switch 26 remains in its closed position and the leads 25 and 29 are otherwise disconnected from the source of electrical supply 27, as by pulling the connecting plug for these leads from an outlet socket, for example. In this way the current regulating system described will always be effective to prevent current surges when the motor 17 is first started, even when the switch 26 is not opened before reconnecting the leads 25 and 29 to the source of electrical supply. Hence, the likelihood of blowing out fuses in the wiring system due to an excessive current surge upon starting the motor is always avoided with certainty. This is especially important in motors employed in household appliances and similar devices, such as a vacuum cleaner, for example.

The screen or member 37 is disposed in its entirety within the casing 10 in a plane transverse to the longitudinal axis thereof, and both transverse sides or faces of the screen are openly positioned in the path of movement of air which is circulated through the casing. Further, the member or screen 37 is ineffective to completely block off movement of air flowing over the exposed surfaces thereof irrespective of the speed at which the fan 33 is driven and also ineffective upon any pivotal movement thereof to substantially alter or shift the manner in which movement of air is effected past the screen. Hence, the screen or member 37 upon any movement thereof is ineffective to cause any appreciable change in resistance to circulation of air through the housing or casing 10.

The fan 33 is disposed transverse to the longitudinal axis of the housing or casing 10 and is of such a size that it extends over a major portion of the cross-sectional area of the housing, and the screen or member 37 is of plate-like form having an area which at least approximates the area of the fan. With such arrangement the screen 37 is movable in one direction due solely to the influence at the exposed surface thereof of changes in air pressure developed by the fan 33.

Figure 3:
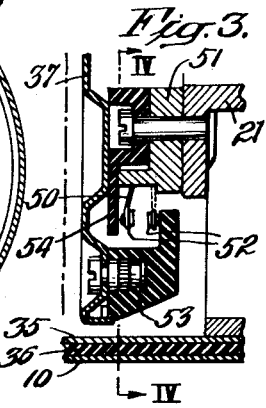
Fig. 3 is a fragmentary sectional view, taken at line III—III of Fig. 4, illustrating a modification of the switch mechanism shown in Figs. 1 and 2.
Figure 4:
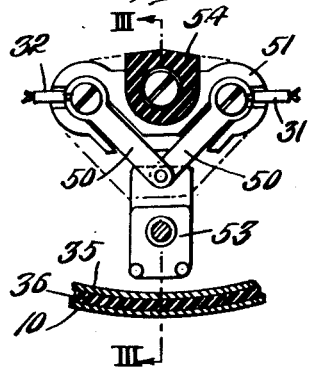
Fig. 4 is a sectional view taken at line IV—IV of Fig. 3.

Figs. 3 and 4 illustrate a modification of the switch mechanism for regulating the current supply to the motor, parts similar to those shown in Figs. 1 and 2 being referred to by the same reference numerals. In this modification the regulating switch comprises a pair of metal springs 50 at right angles to one another which are rigidly secured at their upper ends to a holder 51 of insulating material mounted on the shield 21. The lower free ends of the springs 50 are provided with cooperating contacts 50 which may be formed of silver.

A bridge 53 of insulating material is fixed to the lower end of screen 37. The bridge 53 is of such shape that, when the screen 37 moves toward the left in Fig. 3 due to the suction effect developed by the fan, the right-hand contact 52 is brought into engagement with the left-hand contact 52.

In Figs. 3 and 4 a shield 54 serves as the stop pin for the screen 37 when it is spring biased toward the right. The shield 54 is fixed to the holder 51 and desirably formed of insulating material, thus serving as an insulation barrier between the front contact spring 50 and the screen 37.

It is to be understood that the regulating system of the invention may be employed equally well to short-circuit a starting winding (auxiliary phase) utilized to facilitate starting of single-phase induction motors. While a vacuum cleaner fan is employed in the embodiments described to effect movement of the screen 37, a fan provided for cooling a motor or any other rotatable member may be employed as long as it is capable of producing an air pressure differential which is dependent upon the motor speed.

While particular embodiments of the invention have been shown and described, such variations and modifications are contemplated as fall within the true spirit and scope of the invention, as pointed out in the following claims.

I claim:

1. In combination, a supply circuit, an electric motor connected therein and having resistance means associated therewith to avoid excessive starting current, a centrifugal fan driven by said motor, said fan having a central inlet and from the periphery of which air is discharged, a casing of tubular form in which said motor and fan are disposed for circulating air therethrough, a member disposed in its entirety in said casing in a plane transverse to the longitudinal axis thereof and both transverse sides or faces of which are openly positioned in the path of movement of air which is circulated through said casing, means for pivoting said member for movement about an axis transverse to the longitudinal axis of said casing, said member being ineffective to completely block off movement of air flowing over the exposed surfaces thereof irrespective of the speed at which said fan is driven and ineffective upon any pivotal movement thereof to substantially alter or shift the manner in which movement of air is effected past such member, said member being pivotally movable in one direction responsive to changes in air pressure differential developed in said casing by said fan, resilient means for biasing said member in the opposite direction, and means responsive to predetermined movement of said member in said one direction for short-circuiting said resistance means.

2. In combination, an electric motor having a circuit, means including a switch connected in said circuit for regulating the supply of current to said motor, a centrifugal fan driven by said motor, said fan having a central inlet and from the periphery of which air is discharged, a casing for said motor and fan and through which air is circulated by the latter, a member disposed adjacent said fan in a plane transverse to the longitudinal axis of said casing and both transverse sides or faces of which are openly positioned in the path of movement of air which is circulated through said casing, means for pivoting said member for movement about an axis transverse to the longitudinal axis of said casing, said member being ineffective to completely block off movement of air flowing over the exposed surfaces thereof and ineffective upon any pivotal movement thereof to substantially alter or shift the manner in which movement of air is effected past such member, means for actuating said switch comprising said member which is movable in one direction responsive to suction effect developed by said fan, resilient means for biasing said member in the opposite direction, and a stop to limit the extent of movement of said member effected in said opposite direction by said resilient means.

3. In combination, an electric motor having a circuit, means including a switch connected in said circuit for regulating the supply of current to said motor, a centrifugal fan driven by said motor, said fan having a central inlet and from the periphery of which air is discharged, and means including a member which is movable responsive to the suction effect developed by said fan for actuating said switch to regulate the supply of current to said motor, said member being disposed substantially in a plane parallel to that of said fan and adjacent the side thereof opposite the inlet, both sides or faces of said member being openly positioned in the path of movement of air whose circulation is induced by said fan, and means for pivoting said member for movement about an axis transverse to the axis of rotation of said fan, said member being ineffective to completely block off movement of air flowing over the exposed surfaces thereof irrespective of the speed at which said fan is driven.

4. In combination, an electric motor having a circuit, means including a switch connected in said circuit for regulating the supply of current to said motor, said motor having a shaft, a centrifugal fan fixed to said shaft, a housing of tubular form for said motor and fan and through which air is circulated by the latter, said fan being disposed transverse to the longitudinal axis of the housing, means including a member which is movable responsive to changes in air pressure differential developed in said housing by said fan for actuating said switch to regulate the supply of current to said motor, means for pivoting said member on a stationary part of said motor for movement about an axis transverse to the axis of rotation of said fan, and both transverse sides or faces of said member being openly positioned in the path of movement of air which is circulated through said housing by said fan and ineffective upon any movement thereof to cause appreciable change in resistance to circulation of air through said housing.

5. The combination set forth in claim 4 in which said member comprises a substantially flat screen or plate which is pivotally supported at one side of its center region and operatively associated with said switch means at the opposite side of such center region.

6. In combination, an electric motor having a circuit, means including a switch connected in said circuit for regulating the supply of current to said motor, a centrifugal fan driven by said motor, a housing for said motor and fan and through which air is circulated by the latter, said fan being disposed transverse to the longitudinal axis of said housing and of such size that it extends over a major portion of the cross-sectional area of said housing, means including a member which is movable responsive to changes in air pressure differential developed in said housing by said fan for actuating said switch to regulate the supply of current to said motor, means for pivoting said member for movement about an axis transverse to the axis of rotation of said fan at a region closely adjacent the latter, and said member being ineffective to completely block off movement of air flowing over the exposed surface thereof and ineffective upon any movement thereof to cause appreciable change in resistance to circulation of air through said housing.

7. The combination set forth in claim 6 in which said member comprises a plate or screen having an area which at least approximates the area of said fan.

8. In combination, a supply circuit, an electric motor connected therein and having resistance means associated therewith to avoid excessive starting current, a fan member driven by said motor, a screen disposed transverse to the axis of rotation of said fan member at a region adjacent to the latter, both transverse sides or faces of said screen being openly positioned in the path of movement of air whose circulation is induced by said fan member, said screen being movable in one direction due solely to the influence at the exposed surfaces thereof of suction pressure developed by said fan member, said screen with such movement imparted thereto being ineffective to completely block off movement of air passing over the exposed surface thereof irrespective of the speed at which said fan member is driven, resilient means for biasing said screen in the opposite direction, and means responsive to predetermined movement of said screen in said one direction for short-circuiting said resistance means.

9. In combination, a supply circuit, an electric motor connected therein and having resistance means associated therewith to avoid excessive starting current, a fan member driven by said motor, a screen disposed transverse to the axis of rotation of said fan member at a region adjacent the latter, both transverse sides or faces of said screen being openly positioned in the path of movement of air whose circulation is induced by said fan member, said screen being movable in one direction due solely to the influence at the exposed surfaces thereof of suction pressure developed by said fan member, said screen with such movement imparted thereto being ineffective to alter or shift the manner in which movement of air is effected by said screen, resilient means for biasing said screen in the opposite direction, a stop to limit the extent of movement of said member in said opposite direction by said biasing means, and means responsive to predetermined movement of said screen in said one direction for short-circuiting said resistance means.

10. A device for reducing the starting current for a fan-motor unit, such as in a vacuum cleaner, for example, having a starting resistor associated with the motor which is adapted to be shunted when the motor speed reaches a definite value at which the motor can be suitably connected directly to the source of electrical supply, said device comprising a movable screen beside the fan which is disposed transverse to the axis of rotation of said fan, both transverse sides or faces of said screen being openly positioned in the path of movement of air whose circulation is induced by said fan, said screen being movable in one direction due solely to the influence at the exposed surface thereof of changes in air pressure developed by the fan, said member being ineffective to completely block off movement of air flowing over the exposed surface thereof irrespective of the speed at which the fan is driven and ineffective upon any movement thereof to substantially alter or shift the manner in which movement of air is effected past such screen, means for biasing said screen in the opposite direction, said screen being adapted to move a predetermined distance in said one direction when the motor speed reaches the definite value, and means responsive to movement of said screen in said one direction for said predetermined distance for shunting said resistor, said biasing means being operable to move said screen in the opposite direction and render said resistor effective to reduce starting current whenever the motor is disconnected from the source of electrical supply and again connected thereto.

11. In combination, an electric motor having a circuit, means including a switch connected in said circuit for regulating the supply of current to said motor, said motor having a shaft, a centrifugal fan fixed to said shaft, a housing for said motor and fan and through which air is circulated by the latter, said fan being disposed transverse to the longitudinal axis of the housing, means for actuating said switch to regulate the supply of current to said motor comprising a member pivotally mounted in said housing closely adjacent to and beside said fan which is movable responsive to changes in air pressure differential developed in said housing by said fan, and said member being disposed between said fan and motor and formed with an opening through which said motor shaft extends, said member upon any movement thereof being ineffective to cause appreciable change in resistance to circulation of air through said housing.

12. In combination, an electric motor having a circuit, means including a switch connected in said circuit for regulating the supply of current to said motor, said motor having a shaft, a centrifugal fan fixed to said shaft, a housing for said motor and fan and through which air is circulated by the latter, said fan being disposed transverse to the longitudinal axis of the housing, means for actuating said switch to regulate the supply of current to said motor comprising a member pivotally mounted in said housing closely adjacent to and beside said fan which is movable responsive to changes in air pressure differential developed in said housing by said fan, said member comprising a substantially flat screen or plate which is pivotally supported at one side of its center region and operatively associated with said switch means at the opposite side of such center region, said plate being movable in one direction responsive to said changes in air pressure differential, and means including a spring for biasing said plate in the opposite direction, said spring being located at the same side of the center region as that at which said plate is pivotally supported.

13. The combination set forth in claim 12 in which said biasing means is utilized to support said plate in said casing.

LARS JOHAN FAITH ELL.

REFERENCES CITED

The following references are of record in the file of this patent:

UNITED STATES PATENTS

| Number | Name | Date |
| --- | --- | --- |
| 1,494,189 | Russell et al. | May 13, 1924 |
| 1,946,165 | Irwin | Feb. 6, 1934 |
| 2,144,734 | Jepson | Jan. 24, 1939 |
| 2,292,567 | Jordan | Aug. 11, 1942 |
| 2,312,241 | Drachenburg | Feb. 23, 1943 |
| 2,339,125 | Winter | Jan. 11, 1944 |